(12) United States Patent
Muraki et al.

(10) Patent No.: US 8,895,119 B2
(45) Date of Patent: Nov. 25, 2014

(54) THERMAL TRANSFER SHEET

(71) Applicant: Dai Nippon Printing Co., Ltd., Tokyo (JP)

(72) Inventors: Yuzu Muraki, Tokyo (JP); Yasushi Yoneyama, Tokyo (JP); Yusaku Akiyama, Tokyo (JP); Munenori Ieshige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 14/347,886

(22) PCT Filed: Sep. 21, 2012

(86) PCT No.: PCT/JP2012/074174
§ 371 (c)(1),
(2), (4) Date: Mar. 27, 2014

(87) PCT Pub. No.: WO2013/047352
PCT Pub. Date: Apr. 4, 2013

(65) Prior Publication Data
US 2014/0242305 A1    Aug. 28, 2014

(30) Foreign Application Priority Data
Sep. 30, 2011    (JP) .................................. 2011-217883

(51) Int. Cl.
*B41M 5/40*    (2006.01)
(Continued)

(52) U.S. Cl.
CPC ................. *B41M 5/44* (2013.01); *B41M 5/504* (2013.01); *B32B 27/36* (2013.01);
(Continued)

(58) Field of Classification Search
CPC .......... B41M 5/44; B41M 5/42; B41M 5/423; B41M 5/504; B41M 2205/02; Y10S 428/913; B32B 27/30; B32B 27/36
USPC ..................... 428/32.64, 32.67, 480, 500, 913
See application file for complete search history.

(56) References Cited

U.S. PATENT DOCUMENTS 5,714,434 A    2/1998  Takeuchi et al.
6,008,157 A *  12/1999  Takeuchi et al. .............. 503/227
(Continued)

FOREIGN PATENT DOCUMENTS

JP    06-99670    4/1994
JP    08-90945    4/1996
(Continued)

OTHER PUBLICATIONS

International Search Report, PCT/JP2012/074174, Dec. 25, 2012.

*Primary Examiner* — Betelhem Shewareged
(74) *Attorney, Agent, or Firm* — Young & Thompson

(57) ABSTRACT

Provided is a thermal transfer sheet capable of forming an image having excellent glossiness, and having no printing wrinkle or having a lesser possibility of generating wrinkles. A thermal transfer sheet in which a dyestuff layer or a transcriptive protective layer is formed on one surface of a substrate and a back face layer is formed on another surface of the substrate, wherein the back face layer contains (A) a resin of which weight-average molecular weight (Mw) is more than 15,000; (B) a resin of which weight-average molecular weight (Mw) is not more than 15,000; and (C) a lubricant ingredient; and wherein the (B) resin is contained at an amount range of 3% by weight to 40% by weight on the basis of the total solid content weight of the back face layer.

4 Claims, 1 Drawing Sheet

(51) Int. Cl.
*B41M 5/44* (2006.01)
*B41M 5/50* (2006.01)
*B32B 27/36* (2006.01)
*B41M 5/42* (2006.01)
*B32B 27/30* (2006.01)
*B41M 5/382* (2006.01)

(52) U.S. Cl.
CPC ............... *B41M 5/423* (2013.01); *B32B 27/30* (2013.01); *Y10S 428/913* (2013.01); *B41M 2205/02* (2013.01); *B41M 5/38214* (2013.01); *B41M 5/42* (2013.01); *B41M 2205/30* (2013.01); *B41M 2205/36* (2013.01)
USPC .................... 428/32.64; 428/32.67; 428/480; 428/500; 428/913

(56) References Cited

U.S. PATENT DOCUMENTS

2003/0138719 A1\* 7/2003 Aso et al. .................... 430/126
2006/0198971 A1\* 9/2006 Obonai et al. ............. 428/32.86

FOREIGN PATENT DOCUMENTS

| JP | 09-11647 | 1/1997 |
| JP | 2008-105371 | 5/2008 |
| JP | 2010-100027 | 5/2010 |

\* cited by examiner

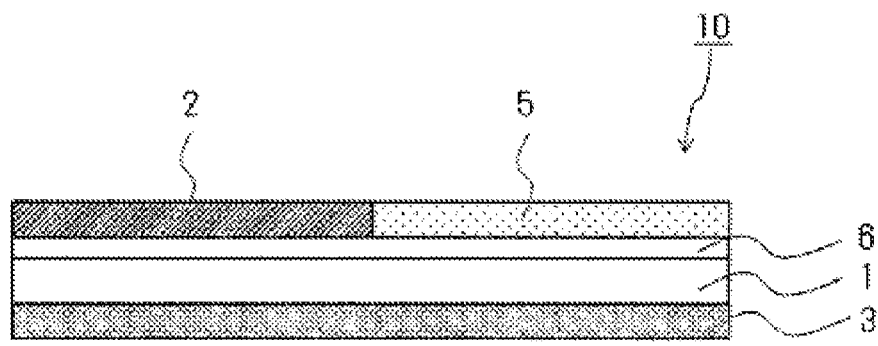

THERMAL TRANSFER SHEET

TECHNICAL FIELD

This invention relates to a thermal transfer sheet.

BACKGROUND ART

Currently, sublimation type thermal transfer recording method is known, wherein a thermal transfer sheet in which a sublimation type dye is supported on a substrate made of a plastic film or the like, and a thermal transfer image-receiving sheet in which a receiving layer is provided on a substrate made of a paper, a plastic film or the like are superposed to form a full color image. Since this method uses the sublimation type dye as a color material, this method excels in reproducibility and gradation of halftone, and thus, a full-color image can be clearly expressed as the original image on the image-receiving sheet. Therefore, this method has been applied in the color image formation for digital cameras, video recorders, computers or the like. Its image can rival silver halide photography with high quality.

As the thermal transfer image-receiving sheet to be used for the sublimation type thermal transfer recording method, a solvent type thermal transfer image-receiving sheet that has a solvent type dyestuff receiving layer of the solvent system, and an aqueous type thermal transfer image-receiving sheet that has an aqueous dyestuff receiving layer are known in the art. When printing is performed under a high temperature and high humidity condition with using these thermal transfer image-receiving sheets, the dyestuff receiving layers thereof come to suffer easily damages since the substrate and the dyestuff receiving layer lose their stiffness by taking up moisture, in both cases of the aqueous type transfer image-receiving sheet and the solvent type transfer image-receiving sheet. And, in the case that the dyestuff receiving layer suffers damages on the printing, a problem that the gloss of the sheet becomes low arises.

We, the inventors have found that the damages suffered on the dyestuff receiving layer were mainly caused by degression of slippage between the thermal transfer sheet and a thermal head on the printing operation. Concretely, we have found that the dyestuff layer of the thermal transfer sheet suffered damages when the slippage between the thermal transfer sheet and the thermal head was low. We have also found that the damages had a bad influence on the dyestuff receiving layer, and thus the gloss of the printed matter became low.

As the thermal transfer sheet which can improve the slippage between it and the thermal head, a thermal transfer sheet which has a back face layer provided on a surface of the substrate which is opposite to the surface onto which the dyestuff layer is provided has been known. For instance, the Patent Literature 1 discloses the one of which back face layer is formed by coating a coating solution onto the substrate and drying it, wherein the coating solution is prepared by dissolving or dispersing a silicone modified urethane resin, a silicone modified acrylic resin, and a polyisocyanate curing agent in an appropriate solvent. Besides, the Patent Literature 2 discloses a thermal transfer sheet in which aback face layer having a cross-linking structure is formed on the substrate by using concurrently a binder resin which has a reacting group such as hydroxyl group with a polyisocyanate. As for the back face layers disclosed in the Patent Literatures 1 and 2, heat resistance is given on the back face layer by curing the binder resin with the curing agent. Moreover, these Patent Literatures disclose that it is preferable to contain a lubricant ingredient such as phosphoric ester, silicone oil, zinc stearyl phosphate, etc., in order to give the slipping property to the back face layer.

However, there is a problem that the gloss decreases when the printing is done under a high temperature and high humidity environment with respect to the thermal transfer sheets disclosed in the Patent Literatures 1 and 2 and the thermal transfer sheet which has a back face layer known in the art. Moreover, there is another problem of generating printing wrinkles when the printing is done under a low temperature and low humidity environment. It is necessary to improve the slipping property and the heat resistance of the back face layer in order to solve these problems. As a way for improving the slipping property, to increase the amount of the lubricant in the back face layer would be considered. However, some residues might adhere to a thermal head on the printing operation in the case that the lubricant is increased, and thus, there is a possibility of occurring a surface flaw or a hairline defect on the printed matter.

In the Patent Literature 3, a thermal transfer sheet which is provided with a back face layer which comprises a cellulose acetate butyrate (A1), at least one resin (A2) selected from the group consisting of acrylic resin and polyvinyl acetal resin, and a lubricant is disclosed.

Even in the case of the thermal transfer sheet disclosed in the Patent Literature 3, however, the dyestuff layer of the thermal transfer sheet suffers damages and the gloss of the printed matter decreases when the image is formed under a high temperature and high humidity environment. Further, the printing wrinkle is generated when the printing is performed under a low temperature and low humidity environment.

PRIOR ART DOCUMENT

Patent Literature

Patent Literature 1: JP 9-11647 A
Patent Literature 2: JP 6-99670 A
Patent Literature 3: JP 2008-105371 A

SUMMARY OF INVENTION

Problem to be Solved by the Invention

The present invention is the one contrived in such a situation, and a main purpose of the present invention is to provide a thermal transfer sheet which is capable of decreasing the damage that the dyestuff receiving layer will suffer, which excels in the glossy appearance, which is capable of forming an image with no printing wrinkle or having a lesser possibility of generating printing wrinkles.

Means for Solving the Problem

The present invention for solving the above mentioned problem is a thermal transfer sheet in which a dyestuff layer or a transcriptive protective layer is formed on one surface of a substrate and a back face layer is formed on another surface of the substrate, and which is characterized in that the back face layer comprises (A) a resin of which weight-average molecular weight (Mw) is more than 15,000; (B) a resin of which weight-average molecular weight (Mw) is not more than 15,000; and (C) a lubricant ingredient; wherein (B) the resin of which weight-average molecular weight (Mw) is not more than 15,000 is contained at an amount range of 3% by weight to 40% by weight on the basis of the total solid content weight of the back face layer.

Further, (A) the resin of which weight-average molecular weight (Mw) is more than 15,000 may be one of a polyvinyl acetal resin and a polyvinyl butyral resin.

Further, (B) the resin of which weight-average molecular weight (Mw) is not more than 15,000 may be one of a cellulosic resin and a polyvinyl butiral resin, and wherein the cellulosic resin may be one of a cellulose acetate butyrate resin and a cellulose acetate propionate resin.

Effect of the Invention

According to the thermal transfer sheet of the present invention, it is possible to form an image which excels in the glossy appearance, which has no printing wrinkle or a lesser possibility of generating printing wrinkles, under both of a high temperature and high humidity environment and a low temperature and low humidity environment.

BRIEF DESCRIPTION OF THE DRAWINGS

FIG. 1 is a schematic sectional view showing an embodiment of the thermal transfer sheet according to the present invention.

EMBODIMENTS FOR CARRYING OUT THE INVENTION

Thermal Transfer Sheet

Hereinafter, the thermal transfer sheet according to the present invention will be described in detail. As shown in FIG. 1, the thermal transfer sheet 10 of the present invention takes a structure where a dyestuff layer 2 or a transcriptive protective layer 5 is formed on one surface of a substrate 1, and a back face layer 3 is formed on another surface of the substrate 1.

(Substrate)

As the substrate 1 used for the thermal transfer sheet 10 of the present invention, it is not particularly limited, as far as it is the one which has transparency in addition to a certain heat resistance and a certain strength, and it is possible to select one arbitrarily from materials known in the art. As such a substrate 1, for instance, polyethylene terephthalate film, 1,4-polycyclohexylene dimethylene terephthalate film, polyethylene naphthalate film, polyphenylene sulfide film, polystyrene film, polypropylene film, polysulfone film, aramide film, polycarbonate film, polyvinyl alcohol film, cellulose derivatives such as cellophane and cellulose acetate, polyethylene film, polyvinyl chloride film, nylon film, polyimide film, ionomer film, etc., which have a thickness of about 0.5-50 μm, preferably, about 1-10 μm, can be enumerated. Further, although these materials may be used singly, it is also possible to use a certain material as a layered film in which the material is combined with one or more of other materials.

(Back Face Layer)

On the another surface of the substrate 1, i.e., the lower side surface of the substrate 1 in FIG. 1, the back face layer 3 is provided. In the present invention, the back face layer 3 contains (A) a resin of which weight-average molecular weight (Mw) is not less than 15,000; (B) a resin of which weight-average molecular weight (Mw) is not more than 15,000; and (C) a lubricant ingredient, for a purpose mainly of improving the heat resistance and the slipping property. Hereinafter, (A) the resin of which weight-average molecular weight (Mw) is not less than 15,000; (B) the resin of which weight-average molecular weight (Mw) is not more than 15,000; and (C) the lubricant ingredient, may be sometimes referred to as (A) ingredient, (B) ingredient, and (C) ingredient, respectively.

Herein, the weight-average molecular weight (Mw) is a value in terms of polystyrene, determined by gel permeation chromatography (GPC).

(A) Resin of which Weight-Average Molecular Weight (Mw) is not Less than 15,000 ((A) Ingredient)

In the present invention, the resin of which weight-average molecular weight (Mw) is more than 15,000 ((A) ingredient) is contained in back face layer 3, and high heat resistance is given to back face layer 3 by the existence of this (A) ingredient.

The heat resistance is given to the back face layer 3 by containing the resin of which weight-average molecular weight (Mw) is larger than 15,000, as stated above. Therefore, as long as the requirement that the weight-average molecular weight (Mw) is larger than 15,000 is satisfied, regardless of the kind of the resin ingredient used as (A) ingredient, the resin ingredient to be used can give heat resistance to the back face layer, and there is no particular limitation about the resin ingredient used as the (A) ingredient. Among the resins which satisfy this requirement, polyvinyl acetal resin, polyvinyl butyral resin, cellulosic resin, acrylic resin, etc., can be enumerated as desirable resins. Especially, the polyvinyl acetal resin and the polyvinyl butyral resin are particularly preferable, because they have a lot of cross-linking reaction points, and they can improve the heat resistance greatly when they are used in combination with a curing agent.

As for the polyvinyl acetal resin and the polyvinyl butyral resin which are preferable resins as the (A) ingredient, it is preferable to have a hydroxyl value of not less than 9% by weight and not more than 25% by weight. When the hydroxyl value lies within the above range, it becomes possible to improve further the heat resistance, and becomes easy to dissolve to a solvent to be used for preparing the coating solution, such as methylethyl ketone, ethyl acetate, toluene, etc. Incidentally, the words "hydroxyl value" used herein, denotes the ratio of monomer component(s) having hydroxyl groups in the resin polymer, and the value calculated as a ratio of the weight of the monomer component(s) having the hydroxyl groups to the total weight of the resin polymer (% by weight).

Moreover, it is desirable that the resin of which weight-average molecular weight (Mw) is larger than 15,000, that is, the (A) ingredient, is a resin that has a cross-linked structure. Higher heat resistance can be given to the back face layer 3 by using the resin that has the cross-linked structure.

The resin that has the cross-linked structure may be prepared by cross-linking, for instance, the polyvinyl acetal resin, the polyvinyl butyral resin, etc., enumerated above as desirable resins, with a cross linking agent. As the cross-linking agent, isocyanate type cross linking agent such as polyisocyanate resin, etc.; oxazoline type cross linking agent; and carbodiimide type cross linking agent, etc., can be enumerated. Although various types are known in the art as the polyisocyanate resin, it is preferable to use an adduct of aromatic isocyanate. As the aromatic polyisocyanate, for instance, 2,4-toluene diisocyanate, 2,6-toluene diisocyanate, or a mixture of 2,4-toluene diisocyanate and 2,6-toluene diisocyanatehexamethylene diisocyanate, 1,5-naphtalene diisocyanate, tolidine diisocyanate, p-phenylene diisocyanate, trans-cyclohexane, 1,4-diisocyanate, xylylene diisocyanate, triphenyl methane triisocyanate, and tris(isocyanate phenyl)thiophosphate may be enumerated. Among them, 2,4- toluene diisocyanate, 2,6-toluene diisocyanate, or a mixture of 2,4-toluene diisocyanate and 2,6-toluene diisocyanate are particularly preferable.

In the case that the resin having a cross-linked structure is formed by the isocyanate type cross-linking agent, it is desirable that the equivalent ratio (—NCO/—OH) between the isocyanate groups owned by the isocyanate type curing agent and hydroxyl group owned by the resin is in the range of not less than 0.1 and not more than 3.

It is preferable that the (A) ingredient is contained at an amount range of not less than 5% by weight and not more than 80% by weight on the basis of the total solid content weight of the back face layer 3, and particularly, at an amount range of not less than 10% by weight and not more than 70% by weight on the basis of the total solid content weight of the back face layer 3. When the containing amount of the (A) ingredient is not more than 5% by weight, there is a tendency to decrease the heat resistance of the back face layer 3. On the other hand, when the containing amount of the (A) ingredient exceeds 80% by weight, there is a tendency to decrease the slipping property of the back face layer 3.

(B) Resin of which Weight-Average Molecular Weight (Mw) is not More than 15,000 ((B) Ingredient)

Although the heat resistance of the back face layer 3 is improved by the existence of the (A) ingredient as above mentioned, the slipping property of the back face layer 3 decreases as the heat resistance of the back face layer 3 is improved. We guessed that the back face layer 3 becomes difficult to soften and thus the lubricant ingredient becomes difficult to bleed to the surface of the back face layer 3 on the printing operation, when the heat resistance of the back face layer 3 is improved. Namely, a trade-off relation is formed between the improvement of the heat resistance and the improvement of the slipping property. Therefore, when a principal objective is to improve the heat resistance, the degression of the slipping property will be accompanied. On the other hand, although it is possible to attain a certain slipping property by including an excess amount of the lubricant ingredient into the back face layer, the heat resistance will decrease with increase in the amount of the lubricant ingredient, and further a problem for the exfoliation of the lubricant, a problem for adhesion of the lubricant as residue to the thermal head, etc., will arise.

Then, in the present invention, (B) the resin of which weight-average molecular weight (Mw) is not more than 15,000, that is an ingredient for generating the performance of the lubricant ingredient adequately is contained, in combination with the above mentioned (A) ingredient that is for giving the heat resistance to the back face layer 3.

When the content of the (B) ingredient is less than 3% by weight on the basis of the total solid content weight of the back face layer 3, it is impossible to make full use of the function of the lubricant ingredient, and as a result the slipping property of the back face layer 3 becomes insufficient. On the other hand, when the content of the (B) ingredient exceeds 40% by weight on the basis of the total solid content weight of the back face layer 3, the (B) ingredient melts by the heat on the printing operation, and the melted (B) ingredient adheres to the thermal head, and the image defects such as thinning of the color of the image, or causing of printing flaw are induced. Considering these respects, in the present invention, the content of the (B) ingredient is defined as the range of not less than 3% by weight and not more than 40% by weight on the basis of the total solid content weight of the back face layer 3.

The (B) ingredient is contained in order to make full use of the performance of (C) the lubricant ingredient contained in the back face layer 3, in other words, it is contained in order to soften the back face layer 3 at the printing so as to bleed out the lubricant ingredient to the surface of back face layer 3, and ultimately, to improve the slipping property of back face layer 3, as a main purpose. This purpose can be achieved by containing the resin having a weight-average molecular weight (Mw) of not more than 15,000 in an amount of not less than 3% by weight and not more than 40% by weight on the basis of the total solid content weight of the back face layer 3. Therefore, there is no especially limitation about the resin ingredient per se, as far as it meets the requirement that its weight-average molecular weight (Mw) is not more than 15,000 and the content thereof is within the above mentioned range.

As preferable examples of the (B) resin ingredient, cellulosic resins and polyvinyl butyral resin can be enumerated. As the cellulosic resins, for instance, cellulose acetate resin, cellulose acetate butyrate resin, cellulose acetate propionate resin, nitrocellulose resin, etc., are exemplified. Among them, cellulose acetate butyrate resin and cellulose acetate propionate resin can be particularly preferably used as the cellulosic resin because they excel in their solubility to the solvents.

Although the (B) ingredient can be a resin which has a weight-average molecular weight (Mw) of not more than 15,000, it is more preferable to be a resin which has a weight-average molecular weight (Mw) of not more than 10,000. It is possible to make the performance of the lubricant ingredient appear more effectively by containing the resin having a Mw of not more than 10,000, and the slipping property of the back face layer 3 can be improved more. Herein, with respect to the lower limit of the weight-average molecular weight (Mw), there is no especially limitation. However, it may take a value of about 1,000.

As is the case with the above mentioned (A) ingredient, the resin of the (B) ingredient can be made up of a resin that has a cross-linked structure. When a resin that has a cross-linked structure while satisfying the condition of the weight-average molecular weight (Mw) of not more than 15,000, is used as the (B) ingredient, it becomes possible to improve the heat resistance of the back face layer 3 as a result of a synergic effect with the (A) ingredient, in addition to making full use of the performance of the lubricant ingredient.

(C) Lubricant Ingredient (C Element);

In order to improve the slipping property against a thermal head, a lubricant ingredient is contained in the back face layer 3. There is no particular limitation about the lubricant ingredient, and it is possible to use any one by selecting appropriately from the lubricants known in the art, for instance, phosphoric esters; metallic soaps; graphite powder; fluorine-based graft polymers; and silicone polymers such as silicone oils, silicone-based graft polymers, acrylic silicone graft polymers, acrylic siloxane, aryl siloxane, etc. Among the above mentioned lubricant ingredients, phosphoric esters and metal soaps can be used especially suitably in the present invention.

As the metal soaps, for instance, multivalent metallic salts of alkyl phosphoric esters, metallic salts of alkyl carboxylic acid may be enumerated. As the above mentioned multivalent metallic salts of alkyl phosphoric esters, the ones which are known in the art as additive for plastics may be used. The above mentioned multivalent metallic salt of alkyl phosphoric ester can be obtained, in general, by substituting an alkali metallic salt of the alkyl phosphoric ester with a polyvalent metal, and the ones of various grades may be available.

As the phosphoric acid ester, for example, (1) phosphoric diesters or monoesters of saturated or unsaturated higher alcohols having a carbon number of 6 to 20, (2) phosphoric monoesters or diesters of polyoxyalkylene alkyl ethers or polyoxyalkylene alkyl allyl ethers, (3) phosphoric diesters or monoesters of alkylene oxide adducts (average addition molar number: 1-8) of the above mentioned saturated or unsaturated alcohols, (4) phosphoric monoesters or diesters of alkyl phenols or alkyl naphthols which have an alkyl group having a carbon number of 8-12, are enumerated. As the saturated and unsaturated higher alcohols for the above (1) and (3) compounds, for example, cetyl alcohol, stearyl alcohol, oleyl alcohol, etc., are enumerated. As the alkyl phenol for the above (3) compounds, for example, nonyl phenol, dodecyl phenol, diphenyl phenol, etc., are enumerated.

There is no particular limitation about the content of the lubricant ingredient. However, when the content of the lubricant ingredient is less than 5% by weight on the basis of the total solid content of the back face layer 3, there is a fear that the slipping property of the back face layer 3 becomes insufficient even in the case that the (B) ingredient is also added, which will be followed by a degression of the gloss of the printed image, and also a possibility of causing printing wrinkle. Meanwhile, when the content of the lubricant ingredient exceeds 40% by weight on the basis of the total solid content of the back face layer 3, there is a fear that some shaved residues of the lubricant ingredient tends to adhere to a thermal head on the printing operation, which will be followed by a possibility of causing a defective printing. Considering these respects, in the present invention, the content of the lubricant ingredient is preferably in the range of not less than 5% by weight and not more than 40% by weight, and more preferably, in the range of not less than 10% by weight and not more than 30% by weight, on the basis of the total solid content weight of the back face layer 3.

Usually, in order to impart slipping property to the back layer 3, the increment in the adding amount of the lubricant ingredient would be only considered. However, due to this increment, some fears such as the adhesion of some shaved residues of the lubricant to the printer head, the deterioration in heat resistance which is caused by the decrement in the content of the binder resin in inverse proportion to the increment of the lubricant ingredient, etc., will arise as described above. On the contrary, in the present invention, it is possible to make full use of the function of the lubricant ingredient without giving the lubricant ingredient in excess amounts, since the (B) ingredient is added to the back face layer 3. Therefore, it is possible to improve the slipping property of the back layer 3, without causing the adhesion of shaved residues and the deterioration in heat resistance which will be given by containing a large amount of the lubricant ingredient.

There is especially no limitation about the thickness of back face layer 3. However, when the thickness of the back face layer is too thin, it may not be able to impart sufficient heat resistance to the back face layer 3. On the other hand, when the thickness of the back face layer 3 is too thick, it may not be transmitted the heat efficiently from the thermal head to the dyestuff layer side. Therefore, it is necessary that the thickness of the back face layer 3 should be determined in consideration of these points, and, the thickness of the back face layer 3 would be preferably in the range of about 0.1-5 µm, and more preferably in the range of about 0.2-2 µm.

There is no particular limitation about the method for forming the back face layer 3. The back face layer 3 may be formed by dissolving or dispersing the above mentioned the (A) ingredient, the (B) ingredient, and the (C) ingredient, and optionally, other ingredients to be added into a suitable solvent; coating thus prepared coating liquid onto the substrate in accordance with a known coating procedure such as the gravure printing method, the screen printing method, the reverse roll coating method using a gravure plate, or the like; and then drying the coated liquid. As the solvent to be used for preparing the coating liquid, for instance, water, toluene, methyl ethyl ketone, ethanol, isopropyl alcohol, cyclohexane, dimethyl formamide, ethyl acetate, etc., can be enumerated.

(Dyestuff Layer)

As shown in FIG. 1, a dyestuff layer 2 is provided on at least a part of the one surface of the substrate 1. Herein, in the embodiment shown in FIG. 1, the dyestuff layer 2 and the transcriptive protective layer 5 takes a structure in accordance with the frame sequential method. However, the dyestuff layer 2 may be provided on the whole surface area of the substrate 1. In addition, for instance, a dyestuff layer containing a sublimable dye and another dyestuff layer containing a heat-fusion type ink which comprises a heat-fusion type composition with a dye, may be provided on one continuous substrate as being frame sequentially. Incidentally, in this invention, it is necessary to provide either the dyestuff layer 2 or the transcriptive layer 5 on the one surface of the substrate 1. Therefore, when the transcriptive layer 5 is provided, the dyestuff layer 2 will be of an arbitrary constituent.

When the thermal transfer sheet according to the present invention is a sublimation type thermal transfer sheet, sublimable dye-containing dyestuff layers are formed as the dyestuff layer 2. On the other hand, when the thermal transfer sheet according to the present invention is a heat-fusion type thermal transfer sheet, the dyestuff layer comprises a heat-fusion composition which contains coloring agent, and becomes a dyestuff layer containing heat-fusion ink. The thermal transfer sheet according to the present invention will be described by taking a sublimation type thermal transfer sheet as a typical example. However, it should be noted that the thermal transfer sheet according to the present invention is not limited to the sublimation type thermal transfer sheet only.

As the materials for the dyestuff layer, any conventionally known dyes may be used. Among them, the ones which have good characteristics for the printing material, for instance, the ones which possess an adequate coloring density, and which can be hardly discolored or faded by light, heat, or temperature are preferable. Examples of such dyes include diarylmethane dyes; triarylmethane dyes; thiazole dyes; merocyanine dyes; pyrazolone dyes; methine dyes; indoaniline dyes; azomethine dyes such as acetophenone azomethine dyes, pyrazolo azomethine dyes, imidazol eazomethine dyes, imidazo azomethine dyes, and pyridone azomethine dyes; xanthene dyes; oxazine dyes; cyanostyrene dyes such as dicyanostyrene dyes and tricyanostyrene dyes; thiazine dyes; azine dyes; acridine dyes; benzeneazo dyes; azo dyes such as, pyridoneazo dyes, thiopheneazo dyes, isothiazoleazo dyes, pyrroleazo dyes, pyrazoleazo dyes, imidazoleazo dyes, thiadiazoleazo dyes, triazoleazo dyes, and disazo dyes; spiropyran dyes; indolinospiropyran dyes; fluoran dyes; rhodaminelactam dyes; naphthoquinone dyes; anthraquinone dyes; and quinophthalone dyes. Concretely, red dyes such as MSRedG (manufactured by Mitsui Toatsu Chemicals, Inc.), Macrolex Red Violet R (manufactured by Bayer), CeresRed 7B (manufactured by Bayer), Samaron Red F3BS (manufactured by Mitsubishi Chemical Co., Ltd.); yellow dyes such as Holon brilliant yellow 6GL (manufactured by Clariant), PTY-52 (manufactured by Mitsubishi Chemical Industries, Ltd.), MACROLEX Yellow 6G (manufactured by Bayer); blue dyes such as Kayaset Blue 714 (manufactured by Nippon Kayaku Co., Ltd.), Waxoline Blue AP-FW (manufactured by ICI), Holon Brilliant Blue S-R (manufactured by Sandoz), MS Blue 100 (manufactured by Mitsui Toatsu Chemical Co., Ltd.), C. I. Solvent Blue 22; etc., are exemplified.

As the binder resin for supporting such a dye, for instance, cellulosic resins such as ethylcellulose, hydroxyethylcellulose, ethylhydroxycellose, hydroxypropylcellulose, methylcellulose, cellulose acetate, and cellulose tributyrate; vinyl resins such as polyvinylalcohol, polyvinyl acetate, polyvinylbutyral, polyvinylacetoacetal, and polyvinylpyrrolidone; acrylic resins such as poly(meth)acrylate and poly(meta)acrylamide; polyurethane resins, polyamide resins, polyester resins, and the like. Among them, cellulosic, vinyl, acrylic, urethane, and polyester resins are preferable from the points of heat resistance and dye-transfer efficiency.

The dyestuff layer 2 may contain optionally additives such as inorganic fine particles, organic fine particles, etc. may be used in the dye layers. Examples of such inorganic fine particles include carbon black, aluminum, molybdenum disulfide, etc. Examples of such organic fine particles include polyethylene waxes, etc. Further, the dyestuff layer 2 may contain optionally a releasing agent. Examples of such a releasing agent include silicone oils, phosphoric esters, etc.

The dyestuff layer 2 may be formed by dissolving or dispersing the dye and the binder resin together with optional additives such as the releasing agent and fillers, etc., in a suitable solvent such as toluene, methyl ethyl ketone, ethanol, isopropyl alcohol, cyclohexane, dimethyl formamide, etc., to prepare a coating liquid; coating the coating liquid on the substrate by a conventional method such as gravure printing, reverse roll coating using a gravure plate, roll coater, bar-coater, etc.; and drying the coated liquid.

(Transcriptive Protective Layer)

As shown in FIG. 1, in the thermal transfer sheet 10 according to the present invention, it is possible to provide the above-mentioned dyestuff layer 2 and the transcriptive protective layer 5 on the substrate 1 as being frame sequentially. As described above, in this invention, it is necessary to provide either the dyestuff layer 2 or the transcriptive layer 5 on the one surface of the substrate 1. Therefore, when the dyestuff layer 2 is provided, the transcriptive layer 5 will be of an arbitrary constituent.

The transcriptive protective layer 5 may take a multi-layered structure, or may take a single-layer structure. When it takes the multi-layered structure, it may include, for instance, an adhesive layer which is provided at its uppermost layer for enhancing the adhesiveness between the transcriptive protective layers; an auxiliary protective layer; a layer which brings any function other than the function of the main part of the protective layer, etc., in addition to a main protective layer which is a main part of the protective layer for giving various durability to the image. The laminating order of the main protective layer and other layers are not particularly limited and are arbitrary. However, in generals, other layers are usually arranged between the adhesive layer and the main protective layer so that the main protective layer may become the uppermost surface layer at the image-receiving area after transcription.

The main protective layer which constitutes a part of the transcriptive protective layer 5 having multi-layered structure, or the transcriptive protective layer 5 in the single-layer structure may be formed with any of various resins known as resins for forming a protective layer. As the resin for forming the protective layer, for instance, polyester resins, polystyrene resin, acrylic resins, polyurethane resins, acrylic urethane resin, silicone modified derivatives of above mentioned resins, blends of any combination of above mentioned resins, ionizing radiation-curable resins, ultraviolet screening resins, etc., are exemplified.

A protective layer containing an ionizing radiation-cured resin is particularly excellent in plasticizer resistance and scratch resistance. As the ionizing radiation-curable resin, anyone known in the art may be used. For example, a resin formed by cross-linking and curing a radically polymerizable polymer or oligomer through ionizing radiation irradiation and, optionally, adding a photopolymerization initiator thereto, and then performing polymerization cross-linking by applying an electron beam or ultraviolet light may be used.

The protective layer containing an ultraviolet screening resin mainly functions to impart light resistance to prints. As the ultraviolet screening resin, for instance, a resin prepared by reacting a reactive ultraviolet absorber with a thermoplastic resin or the above-described ionizing radiation-curable resin to bond the ultraviolet absorber to the resin may be usable. More specifically, the ultraviolet screening resin may be, for example, a resin prepared by introducing a reactive group, such as an addition-polymerizable double bond (for example, a vinyl, acryloyl, or methacryloyl group) or an alcoholic hydroxyl, amino, carboxyl, epoxy, or isocyanate group into a conventionally known non-reactive organic ultraviolet absorber, such as salicylate type, benzophenone type, benzotriazole type, substituted acrylonitrile type, nickel chelate type, or hindered amine type nonreactive organic ultraviolet absorber.

It is usually desirable that it is thickness of about 0.5-10 μm though the main protective layer installed in transcriptive protective layer 5 of the single-layer structure or transcriptive protective layer 5 in the multi-layered structure depends on the kind of the resin for the protective layer formation.

At the uppermost surface of the transcriptive protective layer 5, an adhesive layer may be provided. This adhesive layer may be formed by a resin which excels in adhesiveness on heating, such as, for example, acrylic resins, vinyl chloride type resins, vinyl acetate type resins, vinyl chloride-vinyl acetate copolymer resins, polyester type resins, and polyamide type resins. The thickness of this adhesive layer may be usually about 0.1-5 μm. Moreover, it is also possible to provide a releasing layer between the transcriptive protective layer 5 and the substrate.

(Undercoat Layer)

In the present invention, it is preferable to provide an undercoat layer 6, between the substrate 1 and the dyestuff layer 2 and/or the transcriptive protective layer 5 of the thermal transfer sheet. When the undercoat layer 6 is provided, it becomes possible to improve the adhesiveness between the substrate 1 and the dyestuff layer 2 and/or the transcriptive protective layer 5, and thus, it becomes possible to prevent an abnormal transcription of the dyestuff layer 2 to the thermal transfer image-receiving sheet on the thermal transcription. Incidentally, the undercoat layer is an optional constituent in the thermal transfer sheet 10.

As a polymer which can be used for constituting the undercoating layer, for instance, polyester type resins, polyacrylic ester type resins, polyvinyl acetate type resins, polyurethane type resins, styrene acrylate type resins, polyacrylamide type resins, polyamide type resins, polyether type resins, polystyrene type resins, polyethylene type resins, polypropylene type resins, vinyl type resins such as polyvinyl chloride resin and polyvinyl alcohol resin, polyvinyl acetal type resins such as polyvinyl acetoacetal and polyvinyl butyral, etc., are enumerated.

Moreover, the undercoat layer 6 may be composed of colloidal inorganic pigment's ultrafine particles. When applying it, the thermal transfer sheet is not only becoming possible to prevent an abnormal transcription of the dyestuff layer 2 to the thermal transfer image-receiving sheet on the thermal transcription, but is also becoming possible to enhance the printing density since transferring of dye from the dyestuff layer 2 to the undercoat layer can be inhibited and the dye diffusion to the dye receiving layer of the thermal transfer image-receiving sheet can be duly and effectively promoted.

As the colloidal inorganic pigment's ultrafine particles, any known compound in this art can be used. For instance, silica (colloidal silica), alumina or alumina hydrate (such as alumina sol, colloidal alumina, cationic aluminum oxide or the hydrate thereof, and pseudo boehmite), aluminum silicate, magnesium silicate, magnesium carbonate, magnesium oxide, titanium oxide, etc., are exemplified. Particularly, colloidal silica or alumina sol is preferably used. Primary average particle size of these colloidal inorganic pigment's ultrafine particles is not more than 100 nm, preferably, not more than 50 nm, and particularly preferably, in the range of 3 to 30 nm.

The undercoat layer 6 may be formed by dissolving or dispersing any of the above exemplified resins or the above exemplified colloidal inorganic pigment's ultrafine particles, in a suitable solvent to prepare a coating liquid for forming the undercoat layer; coating the coating liquid by a conventional method such as gravure coating, roll coating method, screen printing method, reverse roll coating method using a gravure plate, etc.; and drying the coated liquid. It is desirable that the coating amount of the liquid for forming the undercoat layer is in the range of about 0.02-1.0 g/m$^2$.

(Back Face Primer Layer)

Further, it is possible to provide aback face primer layer (not shown in FIGURE), between the substrate 1 and the face layer 3. Incidentally, the back face primer layer may be provided in order to improve the adhesiveness between the substrate 1 and the back face layer 3, and it is an optional layer in the thermal transfer sheet according to the present invention. As the back face primer layer, for instance, polyester resins, polyurethane resins, polyacrylic resins, polycarbonate resins, vinyl chloride-vinyl acetate copolymer, polyvinyl butyral, etc., are enumerated.

(Article for Receiving Transcription)

As article for receiving transcription, which may be used in combination with the thermal transfer sheet 10 of the present invention upon the image formation, any article may be utilizable as far as it has a dye-receptive ability for the dye of the dyestuff layer 2, and thermal transfer image-receiving sheets known in this art are enumerated. Further, in the case of paper, metal, glass, or resin which does not possess the dye-receptive ability, it may be usable if at least one surface thereof is provided with a dye-receiving layer. As for the dye-receiving layer, solvent type dye-receiving layers and aqueous type dye-receiving layers are known in the art. However, according to the thermal transfer sheet 10 of the present invention, it is possible to form an image which excels in the glossy appearance, which has no printing wrinkle or a lesser possibility of generating printing wrinkles, regardless of the type of the dye-receiving layer and the printing conditions.

EXAMPLES

Hereinafter, the present invention will be described with referring to Examples and Comparative Examples. Herein, the simplified expressions of "part(s)" in this specification mean "part(s) by weight", unless otherwise especially mentioned.

Example 1

As a substrate, polyethylene terephthalate film which underwent easy-adhesive treatment in advance, and has 4.5 µm in thickness was used. On this substrate, a liquid for forming back face layer having the following composition was coated so as to obtain a thickness of 0.8 g/m$^2$ in the dried state and then the coated liquid was dried to form a back face layer. Then, on a part of the reverse surface side of the substrate, i.e., another surface reverse to the surface onto which the back face layer was provided, a liquid for forming primer layer having the following composition was coated so as to obtain a thickness of 0.10 g/m$^2$ in the dried state, and the coated liquid was dried to form a primer layer. Subsequently, a liquid for forming yellow dyestuff layer (Y) having the following composition, a liquid for forming magenta dyestuff layer (M) having the following composition, and a liquid for forming cyan dyestuff layer (C) having the following composition were coated on the primer layer so as to obtain each individual thickness of 0.6 g/m$^2$ in the dried state, and then the coated liquids were dried through a repeated face-by-face operation for each color in this order in order to form the respective dyestuff layers. Further, on another part of the reverse surface side of the substrate, i.e., another surface reverse to the surface onto which the back face layer was provided, a liquid for forming protective layer having the following composition was coated with a ratio of 1.5 g/m$^2$ on a solid content basis and then the coated liquids was dried to form a protective layer. Ultimately, a thermal transfer sheet of Example 1 in which the back face layer was formed on one surface of the substrate, and the primer layer and dyestuff layers (Y, M, C) were layered in the order on a part of another surface of the substrate, and the protective layer was formed on remaining part of the another surface of the substrate was prepared.

| <Liquid 1 for forming back face layer> | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Cellulose acetate butyrate resin (molecular weight 6,000) (Solus 2100, manufactured by Eastman Chemical Company) | 10 parts |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

| <Liquid for forming primer layer> | |
|---|---|
| Colloidal silica (particle diameter: 4-6 nm, solid content: 10%) (Snowtex OXS, manufactured by Nissan Chemical Industries Ltd.) | 30 parts |
| Polyvinyl pyrrolidone resin (K-90, manufactured by ISP) | 3 parts |
| Water | 50 parts |
| Isopropyl alcohol | 17 parts |

| <Liquid (Y) for forming yellow dyestuff layer> | |
|---|---|
| Dye represented by the following formula (1) | 2.5 parts |
| polyvinyl acetoacetal resin (KS-5, manufactured by Sekisui Chemical Co., Ltd.) | 4.5 parts |
| Polyethylene wax | 0.1 part |

13
-continued

| <Liquid (Y) for forming yellow dyestuff layer> | |
|---|---|
| Methyl ethyl ketone | 45.0 parts |
| Toluene | 45.0 parts |

[Chem. 1]

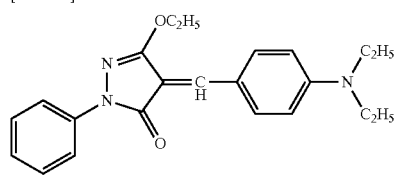

(Formula 1)

| <Liquid (M) for forming magenta dyestuff layer> | |
|---|---|
| Dye represented by the following formula (2) | 2.0 parts |
| polyvinyl acetoacetal resin | 4.5 parts |
| (KS-5, manufactured by Sekisui Chemical Co., Ltd.) | |
| Polyethylene wax | 0.1 part |
| Methyl ethyl ketone | 45.0 parts |
| Toluene | 45.0 parts |

[Chem. 2]

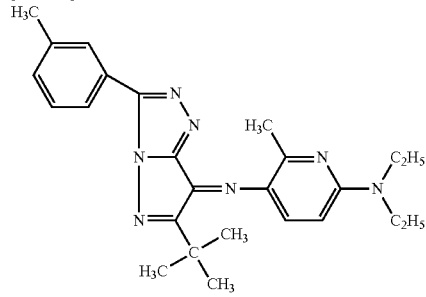

(Formula 2)

| <Liquid (C) for forming cyan dyestuff layer> | |
|---|---|
| Dye represented by the following formula (3) | 2.0 parts |
| polyvinyl acetoacetal resin | 4.5 parts |
| (KS-5, manufactured by Sekisui Chemical Co., Ltd.) | |
| Polyethylene wax | 0.1 part |
| Methyl ethyl ketone | 45.0 parts |
| Toluene | 45.0 parts |

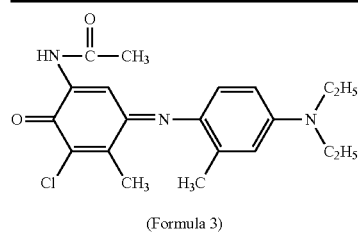

(Formula 3)

| <Liquid for forming protective layer> | |
|---|---|
| Acrylic resin | 69.6 parts |
| (DIANAL BR-83, manufactured by Mitsubishi Rayon Co., Ltd.) | |

14
-continued

| <Liquid for forming protective layer> | |
|---|---|
| Acrylic copolymer to which a reactive UV absorber was reactively linked | 17.4 parts |
| (UVA635L, manufactured by BASF Japan) | |
| Silica | 25 parts |
| Methyl ethyl ketone | 100 parts |
| Toluene | 100 parts |

Example 2

A thermal transfer sheet of Example 2 was obtained by carrying out the same procedure in Example 1 except that the liquid 1 for forming back face layer was replaced by a liquid 2 for forming back face layer having the following composition.

| <Liquid 2 for forming back face layer> | |
|---|---|
| Polyvinyl acetal resin (molecular weight 108,000) | 35 parts |
| (S-LEC KS-3, manufactured by Sekisui Chemical Co., Ltd.) | |
| Polyisocyanate (solid content: 100%, NCO = 17.3% by weight) | 30 parts |
| (BURNOCK D750-45, manufactured by DIC Corporation) | |
| Cellulose acetate butyrate resin (molecular weight 6,000) | 10 parts |
| (Solus 2100, manufactured by Eastman Chemical Company) | |
| Zinc stearyl Phosphate | 10 parts |
| (LBT-1830 purified, manufactured by Sakai Chemical Industry Co., Ltd.) | |
| Zinc stearate | 10 parts |
| (SZ-PF, manufactured by Sakai Chemical Industry Co., Ltd.) | |
| Talc | 5 parts |
| (MICRO ACE P-3, manufactured by Nippon Talc Co., Ltd.) | |
| methyl ethyl ketone | 450 parts |
| toluene | 450 parts |

Example 3

A thermal transfer sheet of Example 3 was obtained by carrying out the same procedure in Example 1 except that the liquid 1 for forming back face layer was replaced by a liquid 3 for forming back face layer having the following composition.

| <Liquid 3 for forming back face layer> | |
|---|---|
| Polyvinyl acetal resin (molecular weight 100,000) | 24.2 parts |
| (S-LEC BX-1, manufactured by Sekisui Chemical Co., Ltd.) | |
| Polyisocyanate (solid content: 100%, NCO = 17.3% by weight) (BURNOCK D750-45, manufactured by DIC Corporation) | 20.8 parts |
| Cellulose acetate butyrate resin (molecular weight 6,000) | 30 parts |
| (Solus 2100, manufactured by Eastman Chemical Company) | |
| Zinc stearyl Phosphate | 10 parts |
| (LBT-1830 purified, manufactured by Sakai Chemical Industry Co., Ltd.) | |
| Zinc stearate | 10 parts |
| (SZ-PF, manufactured by Sakai Chemical Industry Co., Ltd.) | |
| Talc | 5 parts |
| (MICRO ACE P-3, manufactured by Nippon Talc Co., Ltd.) | |
| methyl ethyl ketone | 450 parts |
| toluene | 450 parts |

Example 4

A thermal transfer sheet of Example 4 was obtained by carrying out the same procedure in Example 1 except that the liquid 1 for forming back face layer was replaced by a liquid 4 for forming back face layer having the following composition.

| <Liquid 4 for forming back face layer> | |
|---|---|
| Polyvinyl acetal resin (molecular weight 100,000) (S-LEC BX-1, manufactured by Sekisui Chemical Co., Ltd.) | 18.8 parts |
| Polyisocyanate (solid content: 100%, NCO = 17.3% by weight) (BURNOCK D750-45, manufactured by DIC Corporation) | 16.2 parts |
| Cellulose acetate butyrate resin (molecular weight 6,000) (Solus 2100, manufactured by Eastman Chemical Company) | 40 parts |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Example 5

A thermal transfer sheet of Example 5 was obtained by carrying out the same procedure in Example 1 except that the liquid 1 for forming back face layer was replaced by a liquid 5 for forming back face layer having the following composition.

| <Liquid 4 for forming back face layer> | |
|---|---|
| Polyvinyl acetal resin (molecular weight 100,000) (S-LEC BX-1, manufactured by Sekisui Chemical Co., Ltd.) | 38.8 parts |
| Polyisocyanate (solid content: 100%, NCO = 17.3% by weight) (BURNOCK D750-45, manufactured by DIC Corporation) | 33.2 parts |
| Cellulose acetate butyrate resin (molecular weight 6,000) (Solus 2100, manufactured by Eastman Chemical Company) | 3 parts |
| Zinc stearyl Phosphate (LBT-1830 purified, manufactured by Sakai Chemical Industry Co., Ltd.) | 10 parts |
| Zinc stearate (SZ-PF, manufactured by Sakai ChemicalIndustry Co., Ltd.) | 10 parts |
| Talc (MICRO ACE P-3, manufactured by NipponTalc Co., Ltd.) | 5 parts |
| methyl ethyl ketone | 450 parts |
| toluene | 450 parts |

Example 6

A thermal transfer sheet of Example 6 was obtained by carrying out the same procedure in Example 1 except that the liquid 1 for forming back face layer was replaced by a liquid 6 for forming back face layer having the following composition.

| <Liquid 6 for forming back face layer> | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Cellulose acetate butyrate resin (molecular weight 6,000-10,000) (Solus 2300, manufactured by Eastman Chemical Company) | 10 parts |
| Zinc stearyl Phosphate (LBT-1830 purified, manufactured by Sakai Chemical Industry Co., Ltd.) | 10 parts |

-continued

| <Liquid 6 for forming back face layer> | |
|---|---|
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Example 7

A thermal transfer sheet of Example 7 was obtained by carrying out the same procedure in Example 1 except that the liquid 1 for forming back face layer was replaced by a liquid 7 for forming back face layer having the following composition.

| <Liquid 7 for forming back face layer> | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Cellulose acetate propionate resin (molecular weight 15,000) (CAP504-2.0, manufactured by Eastman Chemical Company) | 10 parts |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Example 8

A thermal transfer sheet of Example 8 was obtained by carrying out the same procedure in Example 1 except that the liquid 1 for forming back face layer was replaced by a liquid 8 for forming back face layer having the following composition.

| <Liquid 8 for forming back face layer> | |
|---|---|
| Polyvinyl acetal resin (molecular weight 100,000) (S-LEC BX-1, manufactured by Sekisui Chemical Co., Ltd.) | 35 parts |
| Polyisocyanate(solid content: 100%, NCO = 17.3% by weight) (BURNOCK D750-45, manufactured by DIC Corporation) | 30 parts |
| Polyvinyl butyral resin (molecular weight 15,000) (S-LEC BL-10, manufactured by Sekisui Chemical Co., Ltd.) | 10 parts |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Example 9

A thermal transfer sheet of Example 9 was obtained by carrying out the same procedure in Example 1 except that the liquid 1 for forming back face layer was replaced by a liquid 9 for forming back face layer having the following composition.

| <Liquid 9 for forming back face layer> | |
|---|---|
| Polyvinyl butyral resin (molecular weight 52,000) (S-LEC BM-2, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Cellulose acetate butyrate resin (molecular weight 6,000) (Solus 2100, manufactured by Eastman Chemical Company) | 10 parts |
| Zinc stearyl Phosphate (LBT-1830 purified, manufactured by Sakai Chemical Industry Co., Ltd.) | 10 parts |
| Zinc stearate (SZ-PF, manufactured by Sakai ChemicalIndustry Co., Ltd.) | 10 parts |
| Talc (MICRO ACE P-3, manufactured by NipponTalc Co., Ltd.) | 5 parts |
| methyl ethyl ketone | 450 parts |
| toluene | 450 parts |

Example 10

A thermal transfer sheet of Example 10 was obtained by carrying out the same procedure in Example 1 except that the liquid 1 for forming back face layer was replaced by a liquid 10 for forming back face layer having the following composition.

| <Liquid 10 for forming back face layer> | |
|---|---|
| Polyvinyl butyral resin (molecular weight 19,000) (S-LEC BL-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Cellulose acetate butyrate resin (molecular weight 6,000) (Solus 2100, manufactured by Eastman Chemical Company) | 10 parts |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Example 11

A thermal transfer sheet of Example 11 was obtained by carrying out the same procedure in Example 1 except that the liquid 1 for forming back face layer was replaced by a liquid 11 for forming back face layer having the following composition.

| <Liquid 11 for forming back face layer> | |
|---|---|
| Cellulose acetate propionate resin (molecular weight 25,000) (CAP-482-0.5, manufactured by Eastman Chemical Company) | 55 parts |
| Polyisocyanate (solid content: 100%, NCO = 17.3% by weight) (BURNOCK D750-45, manufactured by DIC Corporation) | 10 parts |
| Cellulose acetate butyrate resin (molecular weight 6,000) (Solus2100, manufactured by Eastman Chemical Company) | 10 parts |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Example 12

A thermal transfer sheet of Example 12 was obtained by carrying out the same procedure in Example 1 except that the liquid 1 for forming back face layer was replaced by a liquid 12 for forming back face layer having the following composition.

| < Liquid 12 for forming back face layer > | |
|---|---|
| Polyvinyl acetal resin (molecular weight 100,000) (S-LEC BX-1, manufactured by Sekisui Chemical Co., Ltd.) | 45 parts |
| Cellulose acetate butyrate resin (molecular weight 6,000) (Solus2100, manufactured by Eastman Chemical Company) | 30 parts |
| Zinc stearyl Phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Example 13

A thermal transfer sheet of Example 13 was obtained by carrying out the same procedure in Example 1 except that the liquid 1 for forming back face layer was replaced by a liquid 13 for forming back face layer having the following composition.

| < Liquid 13 for forming back face layer > | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 10 parts |
| Cellulose acetate butyrate resin (molecular weight 6,000) (Solus2100, manufactured by Eastman Chemical Company) | 10 parts |
| Zinc stearyl Phosphate (LBT-1830 purified, manufactured by Sakai Chemical Industry Co., Ltd.) | 6.6 parts |
| Zinc stearate (SZ-PF, manufactured by Sakai Chemical Industry Co., Ltd.) | 6.6 parts |
| Phosphoric ester (PLY SURF A210D, manufactured by Dai-ichi Kogyo Seiyaku, Co., Ltd.) | 6.6 parts |
| Talc (MICRO ACE P-3, manufactured by Nippon Talc Co., Ltd.) | 5 parts |
| methyl ethyl ketone | 450 parts |
| toluene | 450 parts |

Example 14

A thermal transfer sheet of Example 14 was obtained by carrying out the same procedure in Example 1 except that the liquid 1 for forming back face layer was replaced by a liquid 14 for forming back face layer having the following composition.

| < Liquid 14 for forming back face layer > | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Polyester resin (molecular weight 3,000) (VYLON 220, manufactured by Toyobo Co., Ltd.) | 10 parts |

| < Liquid 14 for forming back face layer > | |
|---|---|
| Zinc stearyl phosphate | 10 parts |
| (LBT-1830 purified, manufactured by Sakai Chemical Industry Co., Ltd.) | |
| Zinc stearate | 10 parts |
| (SZ-PF, manufactured by Sakai Chemical Industry Co., Ltd.) | |
| Talc | 5 parts |
| (MICRO ACE P-3, manufactured by Nippon Talc Co., Ltd.) | |
| methyl ethyl ketone | 450 parts |
| toluene | 450 parts |

Example 15

A thermal transfer sheet of Example 15 was obtained by carrying out the same procedure in Example 1 except that the liquid 1 for forming back face layer was replaced by a liquid 15 for forming back face layer having the following composition.

| < Liquid 15 for forming back face layer > | |
|---|---|
| Acrylic resin (molecular weight 40,000) | 35 parts |
| (BR-83, manufactured by Mitsubishi Rayon Co., Ltd.) | |
| Cellulose acetate butyrate resin (molecular weight 6,000) | 10 parts |
| (Solus2100, manufactured by Eastman Chemical Company) | |
| Zinc stearyl phosphate | 10 parts |
| (LBT-1830 purified, manufactured by Sakai Chemical Industry Co., Ltd.) | |
| Zinc stearate | 10 parts |
| (SZ-PF, manufactured by Sakai Chemical Industry Co., Ltd.) | |
| Talc | 5 parts |
| (MICRO ACE P-3, manufactured by Nippon Talc Co., Ltd.) | |
| methyl ethyl ketone | 450 parts |
| toluene | 450 parts |

Comparative Example 1

A thermal transfer sheet of Comparative Example 1 was obtained by carrying out the same procedure in Example 1 except that the liquid 1 for forming back face layer was replaced by a liquid A for forming back face layer having the following composition.

| < Liquid A for forming back face layer > | |
|---|---|
| Polyvinyl acetal resin (molecular weight 100,000) | 40.4 parts |
| (S-LEC BX-1, manufactured by Sekisui Chemical Co., Ltd.) | |
| Polyisocyanate (solid content: 100%, NCO = 17.3% by weight) (BURNOCK D750-45, manufactured by DIC Corporation) | 34.6 parts |
| Zinc stearyl phosphate | 10 parts |
| (LBT-1830 purified, manufactured by Sakai Chemical Industry Co., Ltd.) | |
| Zinc stearate | 10 parts |
| (SZ-PF, manufactured by Sakai Chemical Industry Co., Ltd.) | |
| Talc | 5 parts |
| (MICRO ACE P-3, manufactured by Nippon Talc Co., Ltd.) | |
| methyl ethyl ketone | 450 parts |
| toluene | 450 parts |

Comparative Example 2

A thermal transfer sheet of Comparative Example 2 was obtained by carrying out the same procedure in Example 1 except that the liquid 1 for forming back face layer was replaced by a liquid B for forming back face layer having the following composition.

| < Liquid B for forming back face layer > | |
|---|---|
| Polyvinyl acetal resin (molecular weight 100,000) | 13.5 parts |
| (S-LEC BX-1, manufactured by Sekisui Chemical Co., Ltd.) | |
| Polyisocyanate (solid content: 100%, NCO = 17.3% by weight) (BURNOCK D750-45, manufactured by DIC Corporation) | 11.5 parts |
| Cellulose acetate butyrate resin (molecular weight 6,000) | 50 parts |
| (Solus2100, manufactured by Eastman Chemical Company) | |
| Zinc stearyl phosphate | 10 parts |
| (LBT-1830 purified, manufactured by Sakai Chemical Industry Co., Ltd.) | |
| Zinc stearate | 10 parts |
| (SZ-PF, manufactured by Sakai Chemical Industry Co., Ltd.) | |
| Talc | 5 parts |
| (MICRO ACE P-3, manufactured by Nippon Talc Co., Ltd.) | |
| methyl ethyl ketone | 450 parts |
| toluene | 450 parts |

Comparative Example 3

A thermal transfer sheet of Comparative Example 3 was obtained by carrying out the same procedure in Example 1 except that the liquid 1 for forming back face layer was replaced by a liquid C for forming back face layer having the following composition.

| < Liquid C for forming back face layer > | |
|---|---|
| Polyvinyl acetal resin (molecular weight 100,000) | 35 parts |
| (S-LEC BX-1, manufactured by Sekisui Chemical Co., Ltd.) | |
| Polyisocyanate (solid content: 100%, NCO = 17.3% by weight) | 30 parts |
| (BURNOCK D750-45, manufactured by DIC Corporation) | |
| Cellulose acetate butyrate resin (molecular weight 16,000) | 10 parts |
| (CAB551-0.01, manufactured by Eastman Chemical Company) | |
| Zinc stearyl phosphate | 10 parts |
| (LBT-1830 purified, manufactured by Sakai Chemical Industry Co., Ltd.) | |
| Zinc stearate | 10 parts |
| (SZ-PF, manufactured by Sakai Chemical Industry Co., Ltd.) | |
| Talc | 5 parts |
| (MICRO ACE P-3, manufactured by Nippon Talc Co., Ltd.) | |
| methyl ethyl ketone | 450 parts |
| toluene | 450 parts |

Comparative Example 4

A thermal transfer sheet of Comparative Example 4 was obtained by carrying out the same procedure in Example 1 except that the liquid 1 for forming back face layer was replaced by a liquid D for forming back face layer having the following composition.

| < Liquid D for forming back face layer > | |
|---|---|
| Polyvinyl acetal resin (molecular weight 100,000) | 35 parts |
| (S-LEC BX-1, manufactured by Sekisui Chemical Co., Ltd.) | |
| Polyisocyanate (solid content: 100%, NCO = 17.3% by weight) | 30 parts |
| (BURNOCK D750-45, manufactured by DIC Corporation) | |
| Cellulose acetate butyrate resin (molecular weight 30,000) | 10 parts |
| (CAB551-0.2, manufactured by Eastman Chemical Company) | |
| Zinc stearyl phosphate | 10 parts |
| (LBT-1830 purified, manufactured by Sakai Chemical Industry Co., Ltd.) | |
| Zinc stearate | 10 parts |
| (SZ-PF, manufactured by Sakai Chemical Industry Co., Ltd.) | |
| Talc | 5 parts |
| (MICRO ACE P-3, manufactured by Nippon Talc Co., Ltd.) | |
| methyl ethyl ketone | 450 parts |
| toluene | 450 parts |

Comparative Example 5

A thermal transfer sheet of Comparative Example 5 was obtained by carrying out the same procedure in Example 1 except that the liquid 1 for forming back face layer was replaced by a liquid E for forming back face layer having the following composition.

| < Liquid E for forming back face layer > | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Cellulose acetate butyrate resin (molecular weight 40,000) (CAB531-1, manufactured by Eastman Chemical Company) | 10 parts |
| Zinc stearyl phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Comparative Example 6

A thermal transfer sheet of Comparative Example 6 was obtained by carrying out the same procedure in Example 1 except that the liquid 1 for forming back face layer was replaced by a liquid F for forming back face layer having the following composition.

| < Liquid F for forming back face layer > | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Cellulose acetate butyrate resin (molecular weight 25,000) (CAB4821-0.5, manufactured by Eastman Chemical Company) | 10 parts |
| Zinc stearyl phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Comparative Example 7

A thermal transfer sheet of Comparative Example 7 was obtained by carrying out the same procedure in Example 1 except that the liquid 1 for forming back face layer was replaced by a liquid G for forming back face layer having the following composition.

| < Liquid G for forming back face layer > | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Polyvinyl butyral resin (molecular weight 19,000) (S-LEC BL-1, manufactured by Sekisui Chemical Co., Ltd.) | 10 parts |
| Zinc stearyl phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Comparative Example 8

A thermal transfer sheet of Comparative Example 8 was obtained by carrying out the same procedure in Example 1 except that the liquid 1 for forming back face layer was replaced by a liquid H for forming back face layer having the following composition.

| < Liquid H for forming back face layer > | |
|---|---|
| Polyvinyl acetal resin (molecular weight 100,000) (S-LEC BX-1, manufactured by Sekisui Chemical Co., Ltd.) | 35 parts |
| Polyisocyanate (solid content: 100%, NCO = 17.3% by weight) (BURNOCK D750-45, manufactured by DIC Corporation) | 30 parts |
| Polyvinyl acetal resin (molecular weight 17,000) (S-LEC KS-10, manufactured by Sekisui Chemical Co., Ltd.) | 10 parts |
| Zinc stearyl phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Comparative Example 9

A thermal transfer sheet of Comparative Example 9 was obtained by carrying out the same procedure in Example 1 except that the liquid 1 for forming back face layer was replaced by a liquid I for forming back face layer having the following composition.

| < Liquid I for forming back face layer > | |
|---|---|
| Cellulose acetate butyrate resin (molecular weight 6,000) (Solus 2100, manufactured by Eastman Chemical Company) | 65 parts |
| Polyisocyanate (solid content: 100%, NCO = 17.3% by weight) (BURNOCK D750-45, manufactured by DIC Corporation) | 10 parts |
| Zinc stearyl phosphate (LBT-1830 purified, manufactured by Sakai Chemical Industry Co., Ltd.) | 10 parts |
| Zinc stearate (SZ-PF, manufactured by Sakai Chemical Industry Co., Ltd.) | 10 parts |
| Talc (MICRO ACE P-3, manufactured by Nippon Talc Co., Ltd.) | 5 parts |
| methyl ethyl ketone | 450 parts |
| toluene | 450 parts |

Comparative Example 10

A thermal transfer sheet of Comparative Example 10 was obtained by carrying out the same procedure in Example 1 except that the liquid 1 for forming back face layer was replaced by a liquid J for forming back face layer having the following composition.

| < Liquid J for forming back face layer > | |
|---|---|
| Polyvinyl acetal resin (molecular weight 100,000) (S-LEC BX-1, manufactured by Sekisui Chemical Co., Ltd.) | 40 parts |
| Cellulose acetate butyrate resin (molecular weight 16,000) (CAB551-0.01, manufactured by Eastman Chemical Company) | 60 parts |
| Zinc stearate (SZ-PF, manufactured by Sakai Chemical Industry Co., Ltd.) | 5 parts |
| Silicone modified acrylic resin (Symac US-380, solid content 30% by weight, manufactured by TOAGOSEI Co., Ltd.) | 16.7 parts |
| Talc (MICRO ACE P-3, manufactured by Nippon Talc Co., Ltd.) | 5 parts |
| methyl ethyl ketone | 484.5 parts |
| toluene | 484.5 parts |

(Evaluation for Printing Wrinkle)

The thermal transfer sheets obtained in Example 1 were adhered to Y region, M region, and C region of a media set CW-MS46 for a sublimation type thermal transfer printer (manufactured by ALTECH ADS Co., Ltd, type no.: CW-01), respectively. The above mentioned printer and the thermal transfer image-receiving sheets for CW-MS46 were allowed to stand for 3 hours under a low temperature and low humidity environment (20° C., 20%). Then, the thermal transfer image-receiving sheets underwent printing of (1) whole solid black image, (2) right black image (left white), (3) left black image (right white), (4) center black image (left and right white), for each five pieces (total 20 pieces), and evaluated for printing wrinkles based on the following evaluation criteria.

Such a printing was carried out in the same way to the thermal transfer sheets obtained in Examples 2 to 15 and Comparative Examples 1 to 10. Incidentally, the black image was an image which was formed by (255/255 gray scale), and the white image was an image which was formed by (0/255 gray scale). The evaluation results of printing wrinkles were shown in Table 1.

"Evaluation Criteria"

◉: no wrinkle was observed on all images ((1)-(4)).
○: Wrinkles were occurred in one of images (1)-(4).
Δ: Wrinkles were occurred in two or three of images (1)-(4).
X: Wrinkles were occurred in all images (1) to (4).

(Evaluation for Gloss)

The thermal transfer sheets obtained in Example 1 were adhered to Y region, M region, and C region of a media set CW-MS46 for a sublimation type thermal transfer printer (manufactured by ALTECH ADS Co., Ltd, model: CW-01), respectively. The above mentioned printer and the thermal transfer image-receiving sheets for CW-MS46 were allowed to stand for 3 hours under a high temperature and high humidity environment (40° C., 850), without causing condensation. Then, the thermal transfer image-receiving sheets underwent printing of whole solid black image (255/255 gray scale), and the glossiness of the print thus formed was measured. Such a printing and measurement of the glossiness were carried out in the same way to the thermal transfer sheets obtained in Examples 2 to 15 and Comparative Examples 1 to 10. The glossiness was measured by using a glossimeter (manufactured by Nippon Denshoku Co., Ltd., model: VG 2000) at a measurement angle of 45°, and the glossiness was evaluated according to the following criteria. The evaluation results of gloss were also shown in Table 1.

"Evaluation Criteria"

◉: The glossiness was more than 110, provided that the glossiness of the image formed in the combination in Comparative Example 1 was 100.
○: The glossiness was in the range of not less than 105 and less than 110, provided that the glossiness of the image formed in the combination in Comparative Example 1 was 100.
X: The glossiness was less than 105, provided that the glossiness of the image formed in the combination in Comparative Example 1 was 100. The luster evaluation result is also shown in Table 1.

(Evaluation for Printing Residue)

The thermal transfer sheets obtained in Example 1 were adhered to Y region, M region, and C region of a media set CW-MS46 for a sublimation type thermal transfer printer (manufactured by ALTECH ADS Co., Ltd, model: CW-01), respectively. Then, the thermal transfer image-receiving sheets for CW-MS46 underwent printing of whole solid black image (255/255 gray scale), 225-gray scale image (225/255 gray scale) and 180-gray scale image (180/255 gray scale), for each 100 pieces, and the printing residue was evaluated according to the following criteria. Such a printing was carried out in the same way to the thermal transfer sheets obtained in Examples 2 to 15 and Comparative Examples 1 to 10. The evaluation results of printing residue were also shown in Table 1.

"Evaluation Criteria"

◉: The printing defect due to printing residue did not occur at the 100th piece for the whole black solid printing.
○: The printing defect due to printing residue occurred at the 100th piece for the whole black solid printing, but the printing defect did not occur at the 100th piece for the 225-gray scale printing.
Δ: The printing defect due to printing residue occurred at the 100th piece for the whole black solid printing, and at the 100th piece for the 225-gray scale printing, but the printing defect did not occur at the 100th piece for the 180-gray scale printing.
X: The printing defect due to printing residue occurred at the 100th piece for all gray scale types of printings.

TABLE 1

| | Evaluation for Printing wrinkle | Evaluation for gloss | Evaluation for printing residue |
|---|---|---|---|
| Example 1 | ◉ | ◉ | ◉ |
| Example 2 | ◉ | ◉ | ◉ |
| Example 3 | ◉ | ◉ | ◉ |
| Example 4 | ○ | ○ | ○ |
| Example 5 | ○ | ○ | ◉ |
| Example 6 | ◉ | ◉ | ◉ |
| Example 7 | ○ | ○ | ◉ |
| Example 8 | ○ | ○ | ◉ |
| Example 9 | ◉ | ◉ | ○ |
| Example 10 | ◉ | ◉ | ○ |
| Example 11 | ○ | ○ | ○ |
| Example 12 | ○ | ◉ | ○ |
| Example 13 | ◉ | ◉ | ◉ |
| Example 14 | ○ | ○ | ○ |
| Example 15 | ○ | ○ | ○ |
| Comparative Example 1 | X | — | ◉ |
| Comparative Example 2 | ○ | ○ | ◉ |
| Comparative Example 3 | Δ | X | ◉ |
| Comparative Example 4 | X | X | ◉ |
| Comparative Example 5 | X | X | ◉ |
| Comparative Example 6 | X | X | ◉ |
| Comparative Example 7 | Δ | X | ◉ |

TABLE 1-continued

|  | Evaluation for Printing wrinkle | Evaluation for gloss | Evaluation for printing residue |
|---|---|---|---|
| Comparative Example 8 | Δ | X | ⊚ |
| Comparative Example 9 | Δ | X | Δ |
| Comparative Example 10 | Δ | X | ○ |

As is clear from Table 1, with respect to the thermal transfer sheets of Examples 1-15 each of which includes a resin of which weight-average molecular weight (Mw) is more than 15,000; a resin of which weight-average molecular weight (Mw) is not more than 15,000; and a lubricant ingredient; and wherein the content of each ingredient are within the range according to the present invention, it was possible to provide printed matter which had no printing wrinkle and no printing defect due to the printing residue, and excelled in the glossy appearance. On the other hand, with respect to the thermal transfer sheet of Comparative Example 1 which did not include a resin of which weight-average molecular weight (Mw) is not more than 15,000; the thermal transfer sheets of Comparative Examples 3-8 and 10 each of which used two kinds of resins each of which weight-average molecular weight (Mw) is more than 15,000; and the thermal transfer sheet of Comparative Example 9 which did not include a resin of which weight-average molecular weight (Mw) is more than 15,000, the obtained printed matters suffered the printing wrinkles and were of inferior glossy appearance. Further, with respect to the thermal transfer sheet of Comparative Example 2 in which the contents of the ingredients were out of the ranges of the present invention, the obtained printed matter suffered the printing defect due to the occurrence of printing residues, although it had no printing wrinkle and excelled in the glossy appearance.

EXPLANATION OF NUMERIC SYMBOLS

10 . . . Thermal transfer sheet
1 . . . Substrate
2 . . . Dyestuff layer
3 . . . Back face layer
5 . . . Transcriptive protective layer
6 . . . Undercoat layer

The invention claimed is:

1. A thermal transfer sheet in which a dyestuff layer or a transcriptive protective layer is formed on one surface of a substrate and a back face layer is formed on another surface of the substrate,
   wherein the back face layer comprises:
   (A) a resin of which weight-average molecular weight (Mw) is more than 15,000;
   (B) a resin of which weight-average molecular weight (Mw) is not more than 15,000;
   (C) a lubricant ingredient, and
   wherein (B) the resin of which weight-average molecular weight (Mw) is not more than 15,000 is contained at an amount range of 3% by weight to 40% by weight on the basis of the total solid content weight of the back face layer, and (B) the resin of which weight-average molecular weight (Mw) is not more than 15,000 is one of cellulosic resin, polyvinyl butyral resin, and polyester resin.

2. The thermal transfer sheet according to claim 1, wherein (A) the resin of which weight-average molecular weight (Mw) is more than 15,000 is one of a polyvinyl acetal resin, a polyvinyl butyral resin, and an acrylic resin.

3. The thermal transfer sheet according to claim 1, wherein the cellulosic resin is one of a cellulose acetate butyrate resin and a cellulose acetate propionate resin.

4. The thermal transfer sheet according to claim 2, wherein the cellulosic resin is one of a cellulose acetate butyrate resin and a cellulose acetate propionate resin.

* * * * *